E. BRANDENBERGER.
APPARATUS FOR THE CONTINUOUS MANUFACTURE OF CELLULOSE FILMS.
APPLICATION FILED JULY 23, 1909.

991,267.

Patented May 2, 1911.
2 SHEETS—SHEET 1.

E. BRANDENBERGER.
APPARATUS FOR THE CONTINUOUS MANUFACTURE OF CELLULOSE FILMS.
APPLICATION FILED JULY 23, 1909.

991,267.

Patented May 2, 1911.

2 SHEETS—SHEET 2.

UNITED STATES PATENT OFFICE.

EDWIN BRANDENBERGER, OF THAON-LES-VOSGES, FRANCE.

APPARATUS FOR THE CONTINUOUS MANUFACTURE OF CELLULOSE FILMS.

991,267.   Specification of Letters Patent.   Patented May 2, 1911.

Application filed July 23, 1909. Serial No. 509,191.

*To all whom it may concern:*

Be it known that I, EDWIN BRANDENBERGER, a citizen of the Swiss Republic, and resident of Thaon-les-Vosges, Vosges, France, have invented a new and useful Improvement in Apparatus for the Continuous Manufacture of Cellulose Films, which improvement is fully set forth in the following specification.

This invention relates to an apparatus by means of which it is possible to obtain films of indefinite length, starting direct from a water solution of cellulose, more particularly from a solution of cellulose xanthate, the apparatus working in a continuous manner.

In the apparatus, the water solution of cellulose is distributed in the shape of a layer by means of a suitable hopper. It is immediately coagulated by means of a concentrated water solution of sulfate of ammonia or of other suitable salts. The cellulose layer is immediately converted into a cellulose film full of impurities and still soluble in water. On coming out from the sulfate of ammonia bath, the cellulose film is immediately introduced, without coming into a long contact with the air, into a bath consisting of a concentrated or non-concentrated water solution of sea salt. The impurities contained in the film, more particularly sulfids and polysulfids, are dissolved in that bath in which they are thus retained. From there, and without undergoing a long contact with the air, the film is brought into a third bath formed by a mineral acid diluted with water. The concentration of the latter bath varies in accordance with the length of time the film remains in it, its thickness and temperature.

When brought into contact with mineral acid, the cellulose xanthate (when starting from viscose), is decomposed, and cellulose in water, is formed. On being removed from the acid bath, the cellulose film is then washed in cold water and in hot water.

A construction of the apparatus for manufacturing cellulose films in the conditions described, is illustrated by way of example in the accompanying drawing in which—

Figure 1:
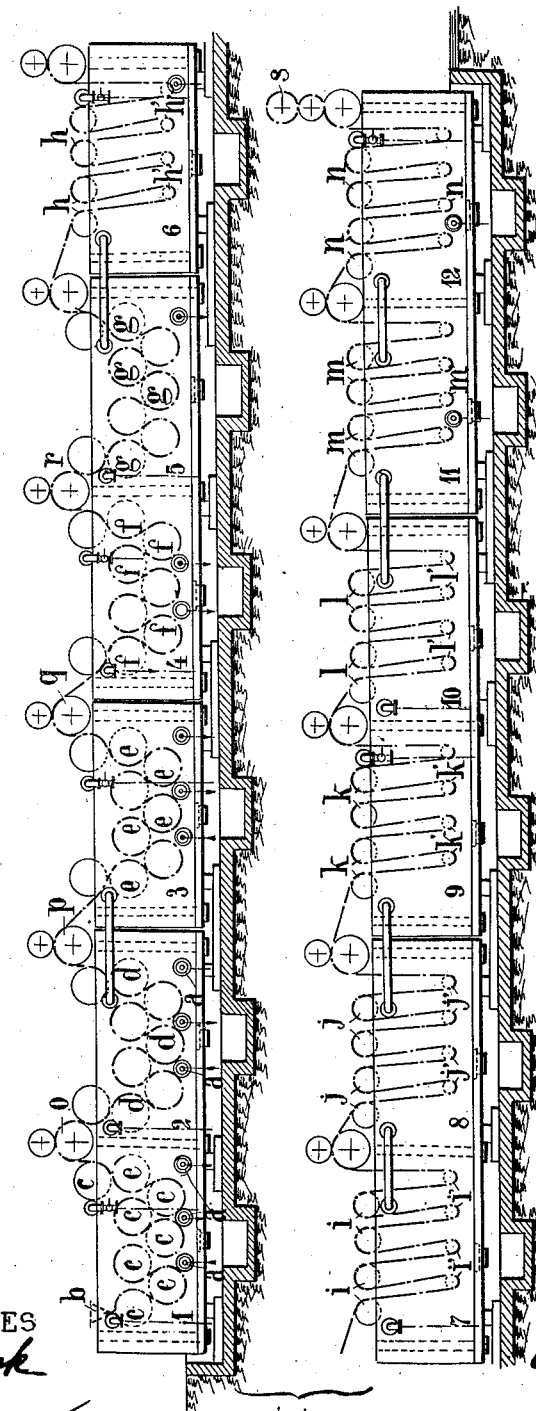
Figure 2:
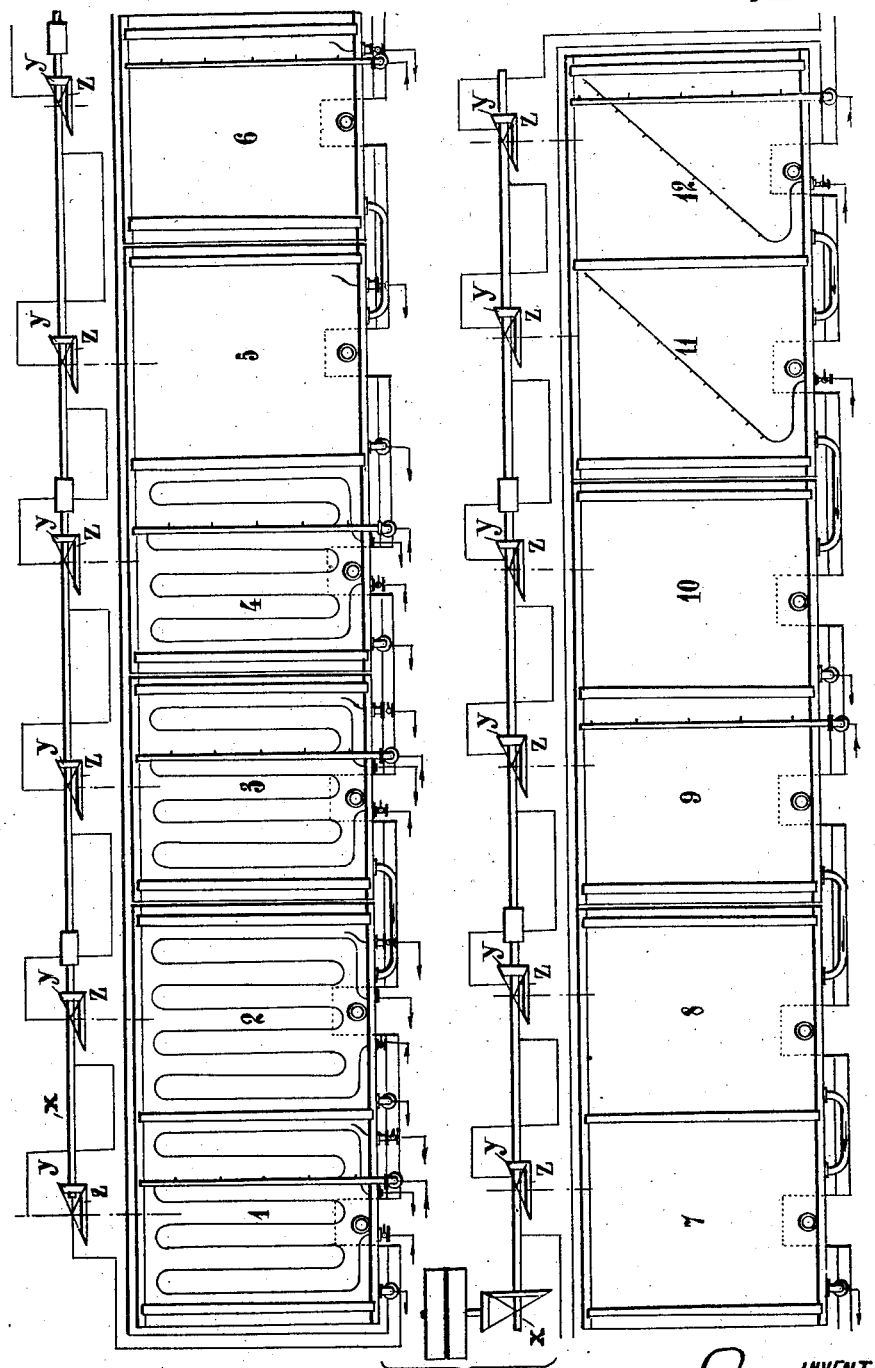

Figure 1 is an elevation, and Fig. 2 a plan.

The apparatus consists of a succession of vats respectively numbered 1–12. This number of vats, as already stated in describing the characteristic features of the process is, however, not in any way binding. It depends on the number of passages which it is desired that the film should make through the sulfate of ammonia bath, or through the sea salt bath, or through the acid bath, or finally, through the water washing bath.

A system of heating which need not be more fully described here, is suitably arranged in the different vats. To that end, hot water or steam coils are arranged in the vats where it is desired to raise the temperature of the liquid.

Water solution, of cellulose xanthate called viscose (if it be used) is introduced into the apparatus into the hopper $b$ (Fig. 1). At the beginning of the operation, the bottom of the said hopper, which is provided with a slot extending across the whole width of the apparatus, is closed by any desired means, and through the said slot is passed, throughout the whole of the length of the slot, a strap of fabric which is secured to the rear end of a strap wound about the rollers $c$ and which passes through the whole apparatus from the vat 1 to the vat 12 going around the rollers in each vat and following the path shown in chain dotted line. The strap comes out from the apparatus after the vat 12. Before starting the apparatus, the fabric band and the strap having been arranged in the manner described, a concentrated solution of sulfate of ammonia or other suitable liquid is introduced into the vat 1. Into the vats 2 and 3 is introduced a concentrated or non-concentrated solution of sea salt. Into the vats 4, 5 and 6 is introduced mineral acid of variable concentration. Into the vats 7–10 cold water, and finally into the vats 11 and 12 hot water.

As may be seen in Fig. 1, in the vat 1 are arranged transversely seven rollers: four at the top, and three at the bottom. All these rollers are driven by a driving gear shown diagrammatically in Fig. 2. This gear is constituted by a longitudinal shaft $x$ extending throughout the whole length of the apparatus and provided opposite each vat with bevel wheels $y$ engaging with bevel wheels $z$. Each of the said wheels $z$ imparting by means of a suitable transmission the desired movements of rotation to the different rollers arranged in the corresponding vat. In the vat 2 seven rollers $d$ are also arranged: four at the top, and three at the bottom. The same in the vat 3, where there are seven rollers $e$, in the vat 4 where there are seven rollers $f$, and in the vat 5 where there are seven rollers $g$. The vat 5 contains, as already stated, the second acid bath, and at that moment the film traveling in the apparatus in the manner hereinafter described, having been exposed to the action of the acid, is rendered insoluble in water. It has become sufficiently strong and solid, so as not to require, as in the first portion of the apparatus, any support at all its points during its travel. For that reason, in the vats 6–12 the film travels freely around ordinary guide rollers, four of which are arranged at the level of the different vats, and four at the bottom. In the vat 6 there are four upper rollers $h$ and four bottom rollers $h'$. In the vat 7 four upper rollers $i$ and four bottom rollers $i'$. In the vat 8 four upper rollers $j$ and four bottom rollers $j'$. In the vat 9 four upper rollers $k$ and four bottom rollers $k'$. In the vat 10 four upper rollers $l$ and four bottom rollers $l'$. In the vat 11 four upper rollers $m$ and four bottom rollers $m'$, and finally in the vat 12 four upper rollers $n$ and four bottom rollers $n'$.

It will be seen that in the first portion of the apparatus, the different rollers $c$ $d$ $e$ $f$ $g$ and the intermediate rollers $o$ $p$ $q$ $r$ are arranged in such manner that in its travel the film is constantly or almost constantly supported at every point throughout the whole of its width. It has, therefore, no strain to support. On the contrary, in the second portion of the machine, where the film has already acquired a certain strength, the rollers are arranged in such manner that the film travels freely following a sinuous line, simply guided downward and upward by the different rollers arranged in the vats. The rollers $c$ $d$ $e$ $f$ and $g$ of the first portions of the machine, are arranged very near each other, but are not in contact, so as to leave between them the necessary space for the travel of the film.

The different vats being full and the rollers having been started, an attendant stationed in front of the machine, opens the bottom of the hopper. The fabric secured to the strap is caused to move through the machine, and the layer of viscose escaping from the hopper in contact with the outside edge of the said fabric becomes immediately coagulated to said fabric in the bath of ammonia sulfate. The fabric in moving carries, therefore, with it and behind it a coagulated layer of water solution of cellulose xanthate, which layer is fed in a continuous manner by the viscose arranged in the hopper which itself can be, moreover, fed automatically or by successive charges. On coming out from the vat 1, the layer of water solution of cellulose xanthate is completely coagulated. It comes then into the vat 2 passing over the rollers $c$ and guided in the said vat 2 by the rollers $d$ as it had been guided in the vat 1 by the rollers $c$, it is purified by the action of the water solution of sea salt contained in the said vat. The impurities, more particularly sulfids and polysulfids, are kept back in the said bath. The purification, always by means of sea salt, is continued in the vat 3 where the film is guided by the rollers $e$. If it were considered, in view of the speed of traveling of the film in the machine and of the thickness of the said film, that the operation in the two vats was not sufficient, it will be readily understood that it would be easy to increase the number of purifying vats. The film arrives then successfully at the vats 4 and 5 where guided by the rollers $f$ and $g$ it passes into the mineral acid bath. The film is converted into cellulose film by the decomposition of the xanthate of sodium, and the cellulose film thus obtained is then insoluble in water. This rendering insoluble is continued in the vat 6 which is still an acid vat, but the travel of the film takes place without guiding at every point as before, the said film now having in itself sufficient strength for no longer requiring support at every point. The chemical operation is at that moment completed, and the manufacture of the film is completed by a simple washing in the vats 7–12 the last two or three of which, for instance, can be heated, so that the washing could be effected with cold water followed by washing with hot water. As soon as the end of the fabric carrying with it the cellulose layer has arrived owing to its travel, at the back portion of the machine, an attendant stationed at that point cuts the cellulose layer by means of a sharp instrument at its junction with the fabric, and places then the edge of the cellulose layer on a winding cylinder $s$ to which a movement of rotation is imparted. The machine in that state can continue to work without any stoppage. It is sufficient to feed in a suitable manner with viscose the original hopper and to replace the winding cylinders when the quantity of film arranged on each of them is sufficient. It is thus possible to obtain by that process cellulose films of an almost indefinite length. It is moreover desirable to point out that instead of winding the cellulose film direct on its leaving the machine on a winding cylinder, the said cellulose film could be folded or carried to dyeing, drying, cutting, etc. machines.

It goes without saying that, for continuous working, it is necessary to provide automatic feed and discharge of each vat, with the necessary overflow. Instead of having superposed guiding rollers only in one portion of the vats 1—5, as shown in the drawing, it is possible to apply the same arrangement to all the vats.

Claim:

A machine for the continuous manufacture of cellulose films comprising a series of vats for the different baths required, suitably driven rollers for conducting the film through the vats and from one to the other, a hopper at the first vat and having a long narrow slot arranged transversely to the series, the rollers of certain of said vats being placed each adjacent to the preceding roller, whereby the film is continuously supported, and a strap terminated at its rear end by a strip of fabric and passed around the rollers of all the vats.

In testimony whereof I have signed this specification in the presence of two subscribing witnesses.

EDWIN BRANDENBERGER.

Witnesses:
 EMILE LEDREL,
 H. C. COXE.